Jan. 14, 1930.  G. A. JOHNSON  1,743,857
COMPOSITE COTTER PIN ARRANGEMENT
Filed Dec. 18, 1925
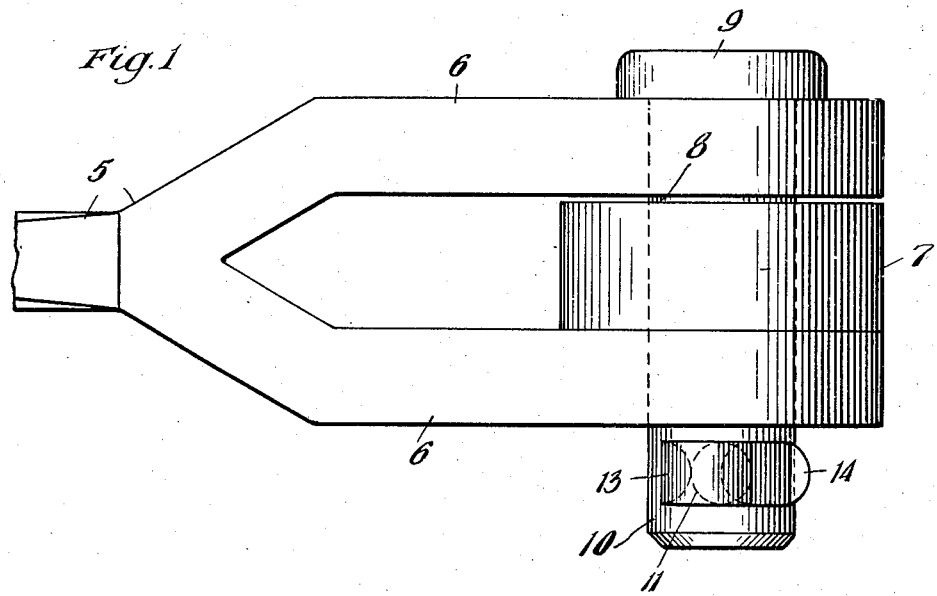
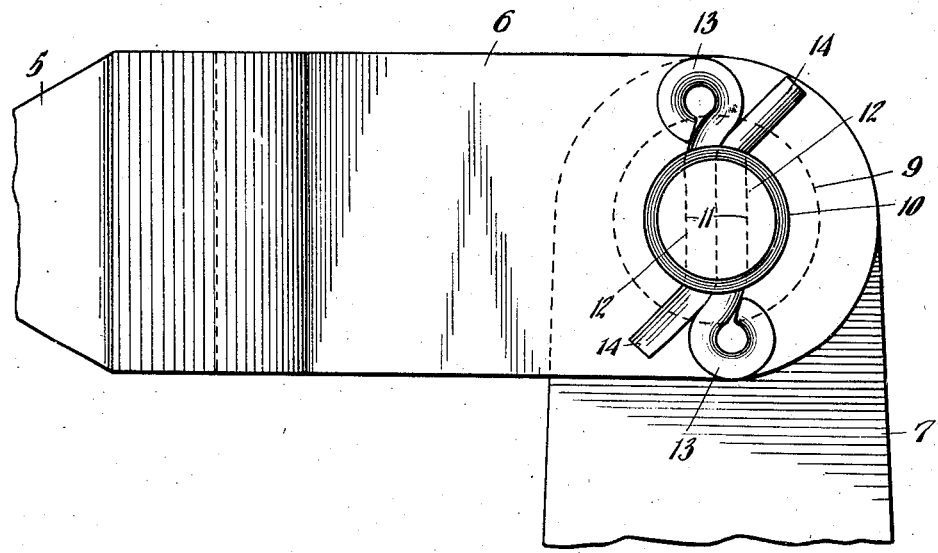
Witness
Wm. Geiger
Inventor
George A Johnson
By George I Haight
His Atty.

Patented Jan. 14, 1930

1,743,857

UNITED STATES PATENT OFFICE

GEORGE A. JOHNSON, OF CHICAGO, ILLINOIS, ASSIGNOR TO W. H. MINER, INC., OF CHICAGO, ILLINOIS, A CORPORATION OF DELAWARE

COMPOSITE COTTER PIN ARRANGEMENT

Application filed December 18, 1925. Serial No. 76,274.

This invention relates to composite cotter pin arrangements.

In railway construction, as in many other arts, the type of cotter pin most universally used to secure certain members together, is in the form of an elongated piece of metal looped intermediate its ends to provide an enlarged head, and having the remaining portions in the form of adjacent parallel legs adapted to be inserted into an opening in one of the members to be secured, the ends of the legs subsequently being separated or spread apart to prevent withdrawal of the pin from the member, the cotter providing an abutment to prevent separation of the members. While this construction is exceedingly convenient and efficient, it is open to several very serious objections, an important one being its small resistance to wear, and this is usually due to its loose fit and consequent excessive vibration, and to the fact that the parts of the pin which sustain the strains present a relatively small thickness of material which is quickly worn through and permits the separation of the members with which it is associated, sometimes with serious consequences, such, for instance, in the case of connecting rods between the brake levers of a railway train in connection with which it is commonly used.

An object of my invention is to provide a composite cotter pin arrangement which comprises twin co-operating members of simple form which may be inserted into an opening in one of the members in such manner as to wedge the parts of the key in position and prevent vibration thereof as well as accidental removal therefrom, and which in position affords an increased amount of material subject to wear.

In the drawings, Figure 1 is a side elevation of a fragment of a brake connecting rod, a brake lever, and a connecting pin, showing my invention in connection with the connecting pin. Figure 2 is a bottom plan view of the brake members shown in Figure 1, disclosing a side elevation of my cotter pin arrangement.

In the drawings, the reference numeral 5 denotes a fragment of a brake connecting rod having a forked end portion 6, the furcations of the forked portion of the connecting rod being adapted to receive therebetween the end of a brake lever 7, the furcations of the connecting rod and the end of the brake lever being apertured to permit the passage of a connecting pin 8 having a head 9 adapted to abut against the outer face of the forked end of the connecting rod, extending through the parts and outwardly beyond the opposite side of the forked end of the connecting rod, as indicated at 10, the end 10 of the pin 8 being provided with an annular bore 11 in the usual manner. The construction above described is of a common form, and no claim is made herein to the same except in conjunction with the cotter pin arrangement forming the subject matter of my invention, which will now be described.

The invention contemplates the use of a cotter pin arrangement made up of two identically similar parts, each of which includes an elongated piece of metal rod having a shank 12, rounded on the outer side and flat on the inner side, one end of said shank being provided with a curved portion 13 which provides a head or eye at one end, the shank being centrally disposed with reference to the curved portion 13.

As above stated, two of the cotter pin members are utilized in securing the connecting pin 8 in position, the cotter pin members being identical in construction, and consequently the same reference characters will be used to indicate the similar parts of both.

When it is desired to secure the composite cotter pin in position to hold the parts together, the opposite ends of the shanks 12 of each cotter pin are inserted into the opening 11 from the opposite ends thereof, and the two members driven or pressed toward each other, causing the free ends of the shanks to come into contact with the opposed heads of the members, continued approach of said members causing a deflection out of a straight line path of the free end of the shank of each member by reason of contact therewith with the adjacent head of the other member as indicated at 14, causing the members to be wedged in position, and thus preventing vibration of the parts in the bore 11, and presenting three thicknesses of material at both ends of the cotter pin arrangement, instead of two thicknesses of material, as in the case of the ordinary cotter pin construction.

The invention also contemplates a method of providing a cotter pin abutment upon a member consisting in the use of cotter pin members of the character above described, or of similar headed shank members adapted to be inserted into a bore in the member upon which the abutment is to be formed, said method consisting in inserting the shank of one headed member into an opening in the supporting member from one side thereof, then inserting the shank of a headed cotter member into said opening from the opposite side of said member, and driving the free ends of the shanks against the opposite heads of said members to deflect the same out of a straight line path and secure the same against accidental withdrawal. It will be appreciated that cotter pins of an ordinary character might be used in carrying out this method, and that due to the presence of the free end of the cotter member wedged in position by the head of the other cotter member, an increase in the metal which forms the abutment is provided, so that the same will wear longer, and, in addition, the parts are held in wedging engagement, thereby eliminating vibration which causes rapid wear of the parts.

While I have herein shown and described what I now consider the preferred manner of carrying out my invention, the same is merely illustrative and I contemplate all changes and modifications that come within the scope of the claims appended hereto.

I claim:

1. A cotter pin member, including a shank portion and a head portion, said shank and head being composed of a continuous rod member flat on one side and round on the other and of uniform cross section, said headed portion being a loop shaped continuation of said shank portion bent in the form of a complete eye with the flat side of said rod member outermost.

2. A cotter pin for connecting devices provided with cotter pin receiving openings, comprising a pair of rod members each of uniform cross section throughout, each member including an elongated shank portion and a head member forming a continuation of the shank portion, said head member forming an offset portion with respect to the shank portion, the shank portions being disposed in lengthwise contact side by side and extending through the opening of said devices when applied in retaining position and said shank portions being reversely arranged with the head members disposed at opposite ends of the pin, the head member of each rod member projecting laterally beyond the plane of longitudinal contact of said rod members and overhanging the other rod member and the adjacent opening of said devices, the free end of the shank portion of each rod member being offset in the same direction as the offset portion formed by the head member of the cooperating rod member and bearing on said offset portion formed by the head member and overhanging the adjacent opening to prevent removal of said cotter pin.

In witness that I claim the foregoing I have hereunto subscribed my name this 16th day of December 1925.

GEORGE A. JOHNSON.